United States Patent
Kempf et al.

(10) Patent No.: US 10,778,945 B1
(45) Date of Patent: Sep. 15, 2020

(54) SPATIAL LIGHT MODULATOR WITH EMBEDDED PATTERN GENERATION

(71) Applicant: Texas Instruments Incorporated, Dallas, TX (US)

(72) Inventors: Jeffrey Matthew Kempf, Dallas, TX (US); Alan Scott Hearn, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/288,266

(22) Filed: Feb. 28, 2019

(51) Int. Cl.
    *H04N 9/30* (2006.01)
    *H04N 9/31* (2006.01)
    *G02B 26/08* (2006.01)

(52) U.S. Cl.
    CPC ......... *H04N 9/3102* (2013.01); *H04N 9/3179* (2013.01); *G02B 26/0833* (2013.01)

(58) Field of Classification Search
    CPC .................................................... H04N 5/7458
    See application file for complete search history.

(56) References Cited

U.S. PATENT DOCUMENTS

| | | | | |
|---|---|---|---|---|
| 5,206,629 A | * | 4/1993 | DeMond | G02B 27/48 345/206 |
| 5,255,100 A | * | 10/1993 | Urbanus | H04N 9/30 348/441 |
| 5,278,652 A | * | 1/1994 | Urbanus | G09G 3/2092 348/571 |
| 5,285,407 A | * | 2/1994 | Gale | G02B 26/0841 365/189.11 |
| 5,339,116 A | * | 8/1994 | Urbanus | G09G 3/2092 348/716 |
| 5,523,803 A | * | 6/1996 | Urbanus | G09G 3/2092 348/771 |
| 5,682,174 A | * | 10/1997 | Chiu | G09G 3/346 345/211 |
| 6,107,979 A | * | 8/2000 | Chiu | G09G 3/346 345/100 |

(Continued)

OTHER PUBLICATIONS

W. Yin, S. P. Morgan, J. Yang, and Y Zhang, "Practical compressive sensing with Toeplitz and circulant matrices," in Proceedings of Visual Communications and Image Processing (VCIP), SPIE, San Jose, CA (2010), 10 pages.

(Continued)

*Primary Examiner* — Paulos M Natnael
(74) *Attorney, Agent, or Firm* — Michelle F. Murray; Charles A. Brill; Frank D. Cimino

(57) ABSTRACT

A word data loading circuit for a spatial light modulator includes a shadow load register (SLR), a load controller, and a word pattern generation (WPG) circuit. The SLR loads a first word of a pseudorandom image pattern. The load controller parallel shifts the first word to a memory cell array. The WPG circuit generates a next word and controls the SLR to change the first word to the next word. The load controller parallel shifts the next word to the array. The WPG circuit generates an additional word and controls the SLR to change the next word to the additional word. The load controller parallel shifts the additional word to the array. The WPG circuit, SLR, and load controller generate and parallel shift further additional words to the array until the pseudorandom image pattern is loaded in the array.

20 Claims, 11 Drawing Sheets

(56) References Cited

U.S. PATENT DOCUMENTS

| | | | |
|---|---|---|---|
| 6,486,704 | B1 | 11/2002 | Hearn |
| 6,741,503 | B1 | 5/2004 | Farris et al. |
| 8,605,015 | B2* | 12/2013 | Guttag ................. G09G 3/3685 345/84 |
| 9,496,682 | B2* | 11/2016 | Abele ................... H04N 9/3135 |
| 9,743,055 | B1 | 8/2017 | Kempf |
| 9,930,303 | B1 | 3/2018 | Morgan et al. |
| 10,033,977 | B2* | 7/2018 | Le Gros .............. H04N 9/3155 |
| 10,319,269 | B2* | 6/2019 | Shiramizu ................ G09G 3/02 |
| 2002/0005913 | A1 | 1/2002 | Morgan et al. |
| 2002/0067510 | A1 | 6/2002 | Kempf |
| 2003/0031373 | A1 | 2/2003 | Kempf |
| 2003/0156301 | A1 | 8/2003 | Kempf et al. |
| 2004/0109002 | A1 | 6/2004 | Farris et al. |
| 2004/0239657 | A1 | 12/2004 | Kempf |
| 2006/0145975 | A1 | 7/2006 | Kempf et al. |
| 2006/0176407 | A1 | 8/2006 | Ikeda et al. |
| 2006/0197776 | A1 | 9/2006 | Morgan et al. |
| 2006/0204123 | A1 | 9/2006 | Kempf et al. |
| 2006/0244759 | A1 | 11/2006 | Kempf |
| 2007/0239930 | A1 | 10/2007 | Hearn |
| 2008/0101399 | A1 | 5/2008 | Sexton et al. |
| 2008/0122861 | A1 | 5/2008 | Ramanath et al. |
| 2008/0158259 | A1 | 7/2008 | Kempf et al. |
| 2008/0159645 | A1 | 7/2008 | Kempf et al. |
| 2008/0159649 | A1 | 7/2008 | Kempf et al. |
| 2009/0066620 | A1 | 3/2009 | Russell et al. |
| 2009/0066718 | A1 | 3/2009 | Russell et al. |
| 2009/0304284 | A1 | 12/2009 | Kempf et al. |
| 2010/0079503 | A1 | 4/2010 | Ramanath et al. |
| 2012/0133902 | A1* | 5/2012 | Nishioka ................ G02B 27/48 353/31 |
| 2012/0320078 | A1 | 12/2012 | Russell et al. |
| 2013/0063470 | A1 | 3/2013 | Kempf et al. |
| 2013/0100177 | A1 | 4/2013 | Clatanoff et al. |
| 2013/0222403 | A1 | 8/2013 | Clatanoff et al. |
| 2015/0245038 | A1 | 8/2015 | Clatanoff et al. |
| 2016/0027365 | A1 | 1/2016 | Kempf |
| 2016/0037147 | A1 | 2/2016 | Kempf et al. |
| 2016/0345021 | A1 | 11/2016 | Kempf et al. |
| 2017/0142426 | A1 | 5/2017 | Kempf |
| 2017/0339383 | A1 | 11/2017 | Kempf |

OTHER PUBLICATIONS

Emmanuel Candes, "Compressive Sensing—A 25 Minute Tour," First EU-US Frontiers of Enginnering Symposium, Cambridge, Sep. 2010, 49 pages.

Guido Gerig, "Structured Lighting," CS 6320, 3D Computer Vision, Spring 2012, 51 pages.

"Introduction to ± Degree Orthogonal Digital Micromirror Devices (DMDs)" Texas Instruments, DLPA008B, Jul. 2008, Revised Feb. 2018, 13 pages.

* cited by examiner $$A = \begin{bmatrix} \alpha_0 & \alpha_{-1} & \alpha_{-2} & \circ \circ \circ & \circ \circ \circ & \alpha_{-(n-1)} \\ \alpha_1 & \alpha_0 & \alpha_{-1} & & & \circ \\ \alpha_2 & \alpha_1 & \circ & \circ & \circ & \circ \\ \circ & \circ & \circ & \circ & \alpha_{-1} & \alpha_{-2} \\ \circ & & \circ & \alpha_1 & \alpha_0 & \alpha_{-1} \\ \alpha_{n-1} & \circ \circ \circ & \circ \circ \circ & \alpha_2 & \alpha_1 & \alpha_0 \end{bmatrix}$$

FIG. 5

$$C = \begin{bmatrix} c_0 & c_{n-1} & \circ \circ \circ & c_2 & c_1 \\ c_1 & c_0 & c_{n-1} & & c_2 \\ \circ & c_1 & c_0 & \circ & \circ \\ c_{n-2} & & \circ & \circ & c_{n-1} \\ c_{n-1} & c_{n-2} & \circ \circ \circ & c_1 & c_0 \end{bmatrix}$$

FIG. 7

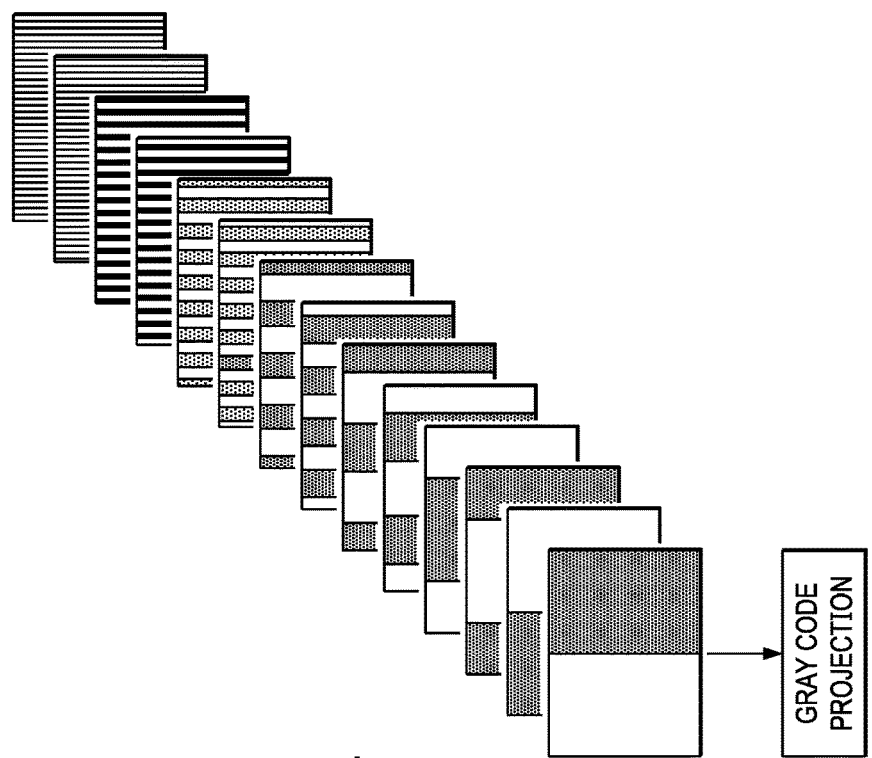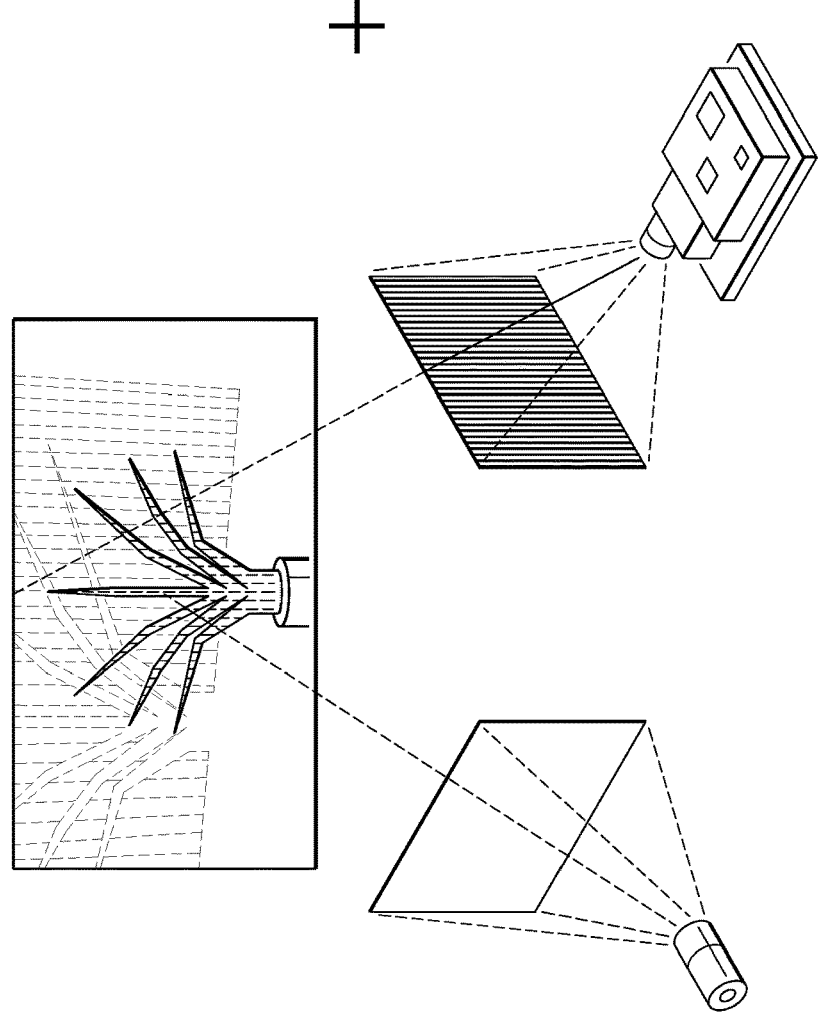
FIG. 9

SPATIAL LIGHT MODULATOR WITH EMBEDDED PATTERN GENERATION

BACKGROUND

Compressed sensing (CS) is a field of signal processing in which a sparse signal is recovered from far fewer samples than what is deemed necessary by the Nyquist sampling theorem. With CS, a signal is sampled in a pseudorandom manner. The number of samples taken is on the order of $\frac{1}{10}^{th}$ of that needed to satisfy the Nyquist criterion. After all samples have been gathered, an L1 norm minimization technique is applied to the corresponding undetermined system of linear equations and a full resolution signal is reconstructed. With regards to hyperspectral imaging, CS approaches have been shown to provide cost savings over conventional methods. For example, a two-dimensional IR sensor costs more than a one-dimensional IR photodiode.

Processing speed and capture time are the biggest disadvantages to CS systems. The former is a result of having to solve a system of linear equations for each reconstructed signal. A conventional approach requires no processing since it directly samples the high-resolution signal. CS processing speed is being addressed with algorithm optimization and tailored hardware, e.g. FPGA/ASIC accelerators. Digital light processing (DLP®) can directly impact capture time since most CS applications employ digital micromirror devices (DMDs) to perform the pseudo-random measurements. DLP is a registered trademark of Texas Instruments Incorporated of Dallas, Tex. In these DLP applications, capture time is directly proportional to the load time of the DMD. For example, a pseudorandom binary pattern must be loaded and then the hyperspectral sensor must capture the reflected result. This is repeated until all desired patterns have been displayed.

SUMMARY

An example of a word data loading circuit for a spatial light modulator includes a shadow load register, a load controller, and a word pattern generation circuit. The shadow load register loads a seed word as a first word of a pseudorandom pattern for an image frame of a desired scene in conjunction with loading the pseudorandom pattern in a memory cell array of the spatial light modulator and configuring a mirror element array of the spatial light modulator to sense the pseudorandom pattern for the image frame after the pseudorandom pattern is loaded in the memory cell array. The load controller parallel shifts the first word from the shadow load register to a first row or column of the memory cell array. The word pattern generation circuit generates a next word for the shadow load register based on the pseudorandom pattern and the first word and controls the shadow load register to change the first word to the next word. The load controller parallel shifts the next word to a next row or column of the memory cell array. The word pattern generation circuit generates an additional word for the shadow load register based on the pseudorandom pattern and the next word and controls the shadow load register to change the next word to the additional word. The load controller parallel shifts the additional word to a further next row or column of the memory cell array. The word pattern generation circuit, shadow load register, and load controller generate and parallel shift further additional words from the shadow load register to the memory cell array until the pseudorandom pattern for the image frame is loaded in the memory cell array.

An example of a spatial light modulator includes a memory cell array, a mirror element array, and a word data loading circuit with a shadow load register, a load controller, and a word pattern generation circuit.

An example of a method of generating pseudorandom patterns in a spatial light modulator includes loading a shadow load register of a spatial light modulator with a seed word as a first word of a pseudorandom pattern for an image frame of a desired scene in conjunction with loading the pseudorandom pattern in a memory cell array of the spatial light modulator and configuring a mirror element array of the spatial light modulator to sense the pseudorandom pattern for the image frame after the pseudorandom pattern is loaded in the memory cell array. The first word is parallel shifted to a first row or column of the memory cell array. A next word is generated for the shadow load register based on the pseudorandom pattern and the first word and the shadow load register is controlled to change the first word to the next word. The next word is parallel shifted to a next row or column of the memory cell array. An additional word is generated for the shadow load register based on the pseudorandom pattern and the next word and the shadow load register is controlled to change the next word to the additional word. The additional word is parallel shifted to a further next row or column of the memory cell array. The generating and parallel shifting of further additional words from the shadow load register to the memory cell array is repeated until the pseudorandom pattern for the image frame is loaded in the memory cell array.

BRIEF DESCRIPTION OF THE DRAWINGS

FIG. 5 is a diagram of Toeplitz matrix.

FIG. 7 is a diagram of circulant matrix.

FIG. 9 is a diagram of an exemplary implementation of structured light patterns.

DETAILED DESCRIPTION

Figure 1:
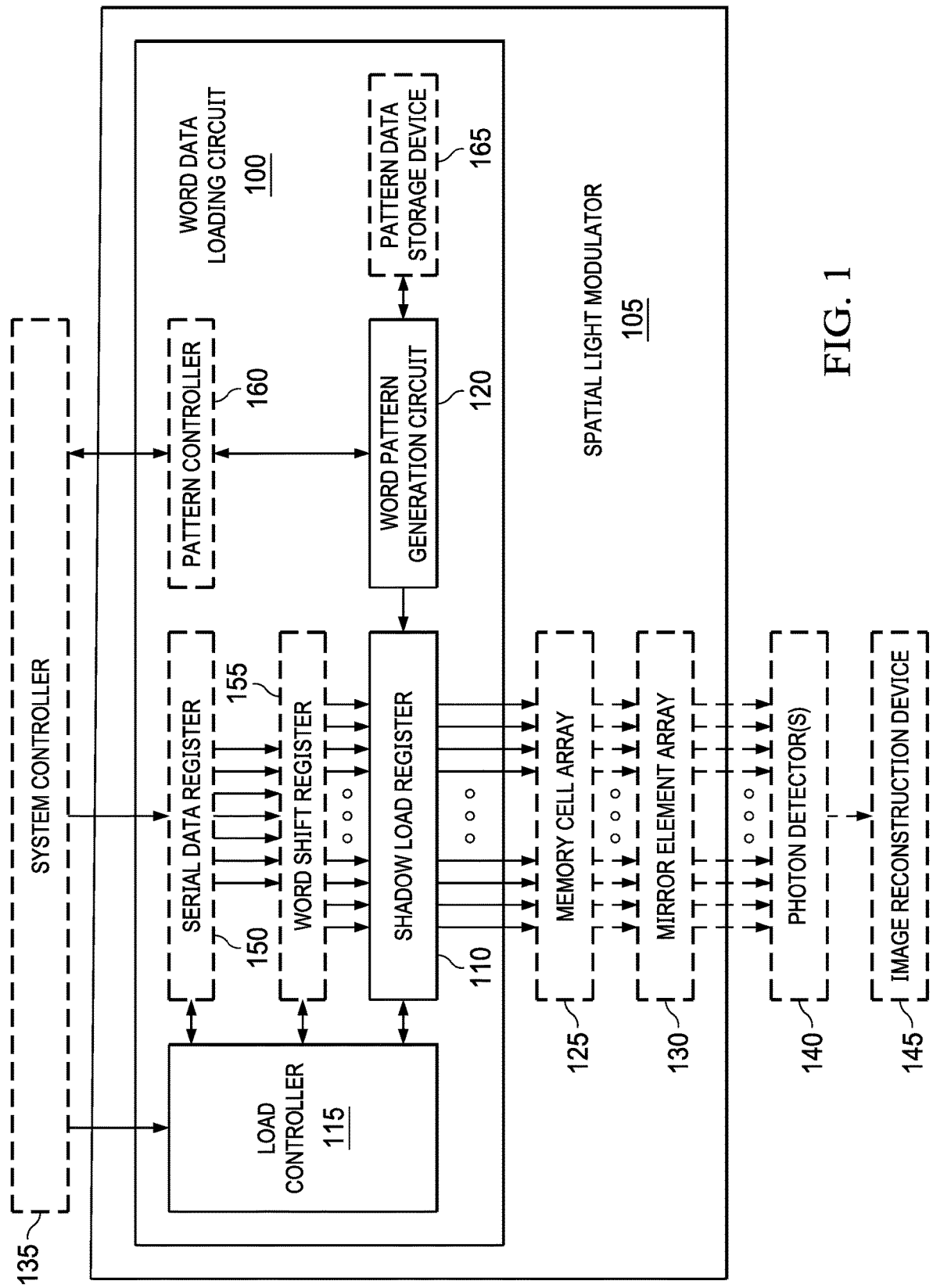
FIG. 1 is a block diagram of an exemplary spatial light modulator with an exemplary word data loading circuit.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Spatial light modulators (SLMs), as used for imaging applications, are arrays of pixel-generating elements that emit or reflect light to an image plane. The pixel-generating elements are often themselves referred to as "pixels," as distinguished from the pixels of the image. This terminology applies because it is understood that more than one pixel of the SLM array can be used to generate a pixel of the image. The pixels of the SLM are individually addressable and the image is defined by which pixels are on or off at a given time. For example, a digital micromirror device (DMD) is a type of SLM. The following disclosure describes examples of SLMs that use mirror element arrays. In certain examples, the description refers to DMD-type SLMs. However, it is understood that the SLMs described herein include any type of SLM suitable for implementing the disclosed techniques for embedded pattern generation.

Additionally, many of the examples disclosed herein show a one-to-one correspondence between memory cells of a memory cell array and mirror elements of a mirror element array. However, it is understood that other examples may implement groups of mirror elements that share a memory cell. For example, the memory cell is connected to multiple pairs of address electrodes and one mirror element in the group that is to be addressed with the data stored in the memory cell is enabled.

With reference to FIG. 1, an example of a word data loading circuit 100 for a spatial light modulator 105 includes a shadow load register 110, a load controller 115, and a word pattern generation circuit 120. The shadow load register 110 is configured to load a seed word as a first word of a pseudorandom pattern for an image frame of a desired scene in conjunction with loading the pseudorandom pattern in a memory cell array 125 of the spatial light modulator 105 and configuring a mirror element array 130 of the spatial light modulator 105 to sense the pseudorandom pattern for the image frame after the pseudorandom pattern is loaded in the memory cell array 125. In certain examples, the seed word is a non-zero value with pseudorandom characteristics. In other examples, the seed word is either all zeros or all ones. The load controller 115 is configured to parallel shift the first word from the shadow load register 110 to a first row or column of the memory cell array 125. The shadow load register 110 is configured to store n bits and the memory cell array 125 is configured with x rows and y columns, where n equals y when the word is for a row of the memory cell array 125 or x when the word is for a column of the memory cell array 125. For example, a memory cell array 125 may be configured with 1,080 rows and 1,920 columns, 720 rows and 1,280 columns, or any other arrangement of rows and columns of pixels for an image frame.

The word pattern generation circuit 120 is configured to generate a next word for the shadow load register 110 based the pseudorandom pattern and the first word. The word pattern generation circuit 120 is configured to control the shadow load register 110 to change the first word to the next word. The load controller 115 is configured to parallel shift the next word to a next row or column of the memory cell array 125. The word pattern generation circuit 120 is configured to generate an additional word for the shadow load register 110 based the pseudorandom pattern and the next word. The word pattern generation circuit 120 is configured to control the shadow load register 110 to change the next word to the additional word. The load controller 115 is configured to parallel shift the additional word to a further next row or column of the memory cell array 125. Word pattern generation circuit 120, shadow load register 110, and load controller 115 are configured to generate, control, and parallel shift further additional words from the shadow load register 110 to the memory cell array 125 until the pseudorandom pattern for the image frame is loaded in the memory cell array 125.

In this example, the load controller 115 is configured to receive configuration, synchronization, and control signals from a system controller 135. Cells of the memory cell array 125 are configured to individually switch corresponding mirrors of the mirror element array 130 to an "ON" position that reflects a pixel portion of the desired scene toward one or more photon detectors 140 or to an "OFF" position. The photon detector(s) 140 are configured to transmit pixel data for the image frame to an image reconstruction device 145. The image reconstruction device 145 is configured to combine a sequence of multiple, partially populated image frames of the desired scene that are closely related in time to reconstruct a suitable image frame representation of the desired scene.

In another example, the word data loading circuit 100 also includes a serial data receiver 150, a word shift register 155, a pattern controller 160, and a pattern data storage device 165. In this example, the serial data receiver 150 is configured to receive serial input data for configuring with the memory cell array 125 from the system controller 135. The serial data receiver 150 is also configured to receive configuration, synchronization, and control signals from the system controller 135. The serial data receiver 150 is configured for parallel transfer of portions of the serial input data to the word shift register 155. The word shift register 155 is configured for parallel transfer of the word data to the shadow load register 110. The word data is based on combining bits from the serial input data into words that correspond to a row or column of the memory cell array 125. The pattern controller 160 is configured to receive configuration, synchronization, and control signals from the system controller 135. The pattern data storage device 165 is configured to store word data for configuring the memory cell array 125 and parameters and other characteristics of the pseudorandom patterns for use by the word pattern generation circuit 120.

Figure 2:
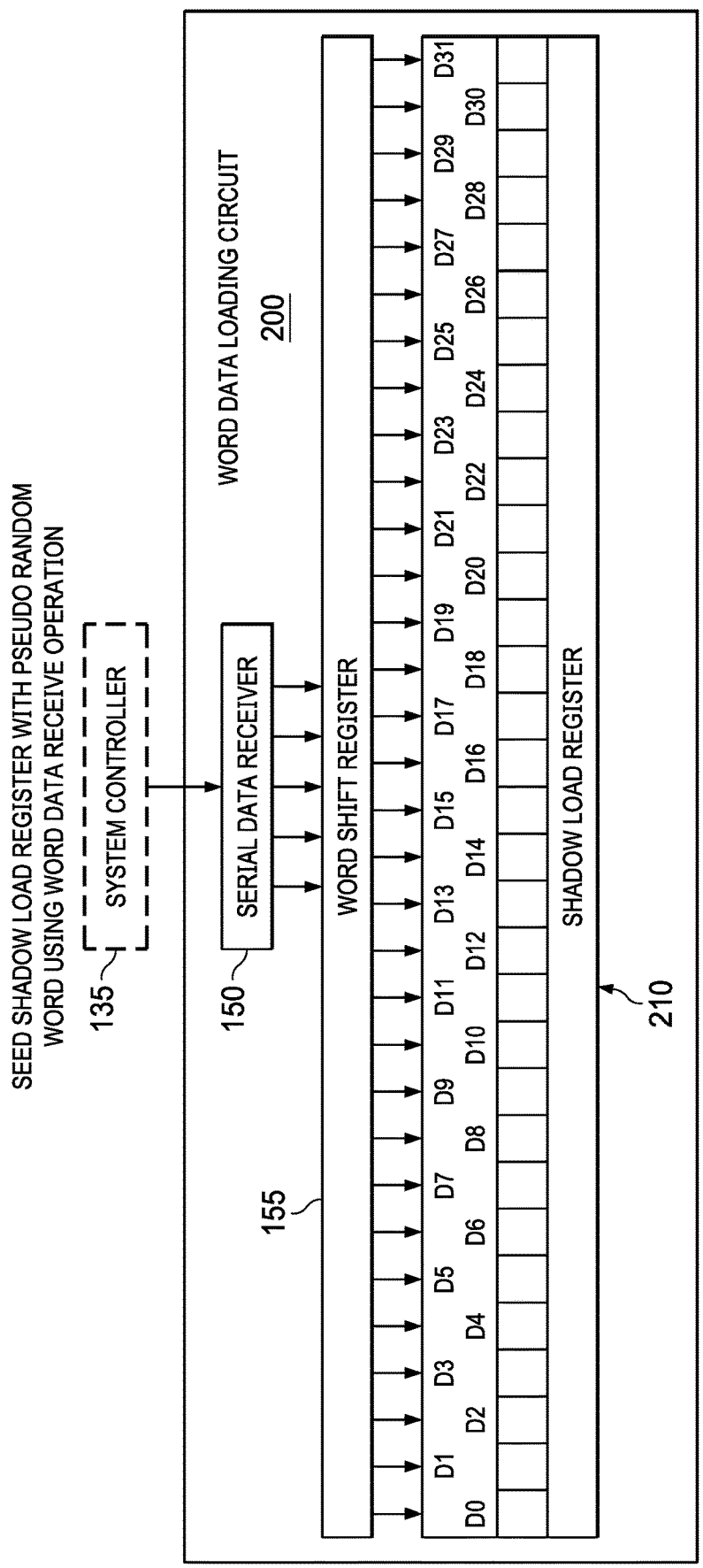
FIG. 2 is a block diagram of another exemplary word data loading circuit.

With reference to FIG. 2, another example of a word data loading circuit 200 includes a shadow load register 210 and the serial data receiver 150 and word shift register 155. The shadow load register 210 is configured to store n bits. FIG. 2 shows 32 bits in the shadow load register 210 for exemplary purposes only. The serial data receiver 150 is configured to receive the seed word from the system controller 135. In this example, the serial data receiver 150 is configured to parallel shift portions of the seed word to the word shift register 155 until the seed word is loaded in the word shift register 155. The word shift register 155 is configured to parallel shift the seed word to the shadow load register 110.

Figure 3:
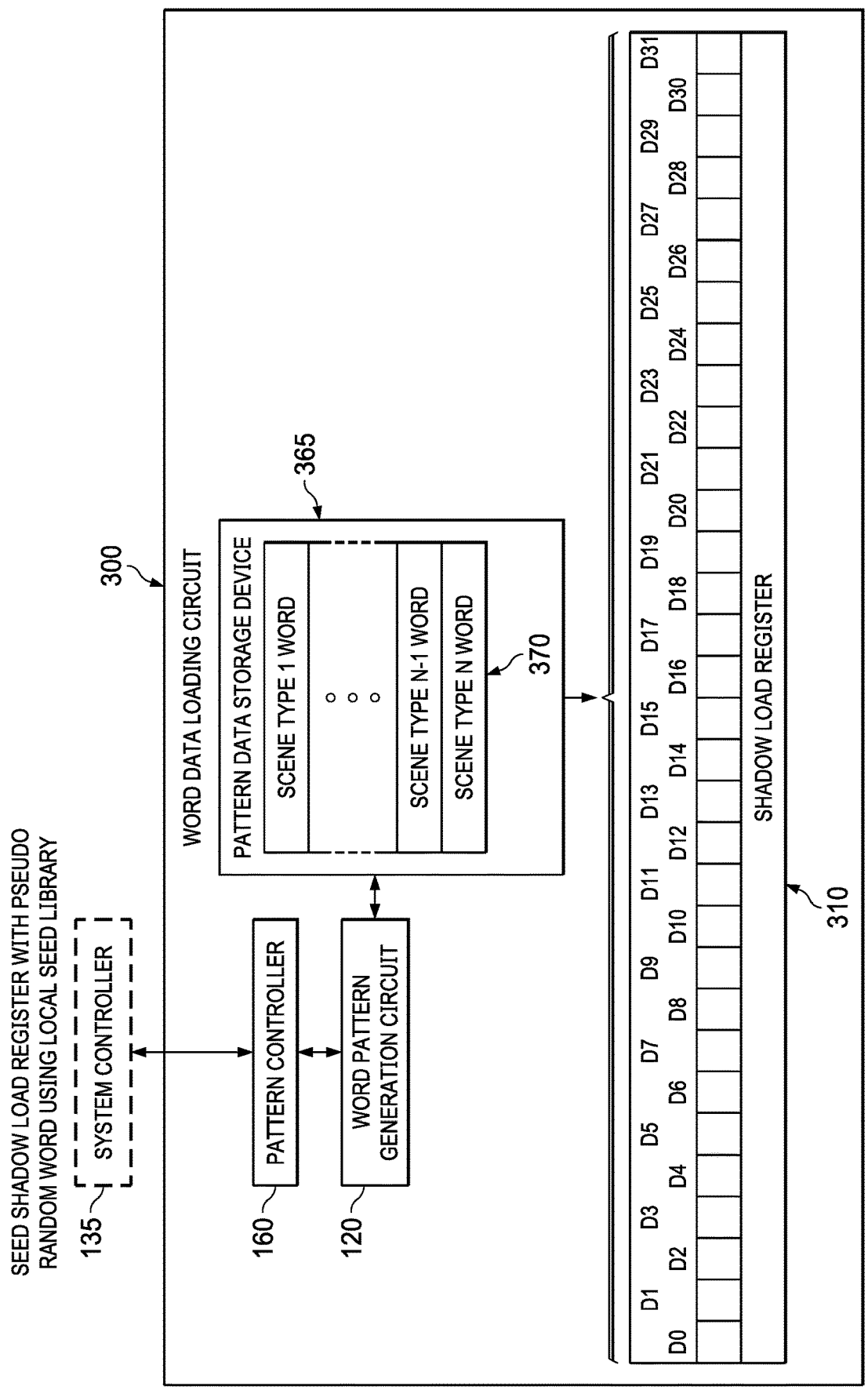
FIG. 3 is a block diagram of yet another exemplary word data loading circuit.

With reference to FIG. 3, yet another example of a word data loading circuit 300 includes a shadow load register 310, a pattern data storage device 365, and the word pattern generation circuit 120 and pattern controller 160. The shadow load register 310 is configured to store n bits. FIG. 3 shows 32 bits in the shadow load register 310 for exemplary purposes only. In this example, the pattern data storage device 365 stores one or more seed words (e.g., scene type 1 word 370) to load as the first word of the pseudorandom pattern in the shadow load register 310. For example, different types of scenes can exhibit different levels of sparsity. Likewise, different seed words can reflect different levels of sparsity with which to start the pseudorandom pattern. The word pattern generation circuit 120 is configured to identify a seed word in the pattern data storage device 365. The word pattern generation circuit 120 is configured to parallel shift the seed word from the pattern data storage device 365 to the shadow load register 310. In a further example, the pattern controller 160 is configured to receive seed word identification information from the system controller 135. In this example, the pattern controller 160 is configured to provide the seed word identification information to the word pattern generation circuit 120 in conjunction with the word pattern generation circuit 120 parallel shifting the seed word from the pattern data storage device 365 to the shadow load register 310.

Figure 4:
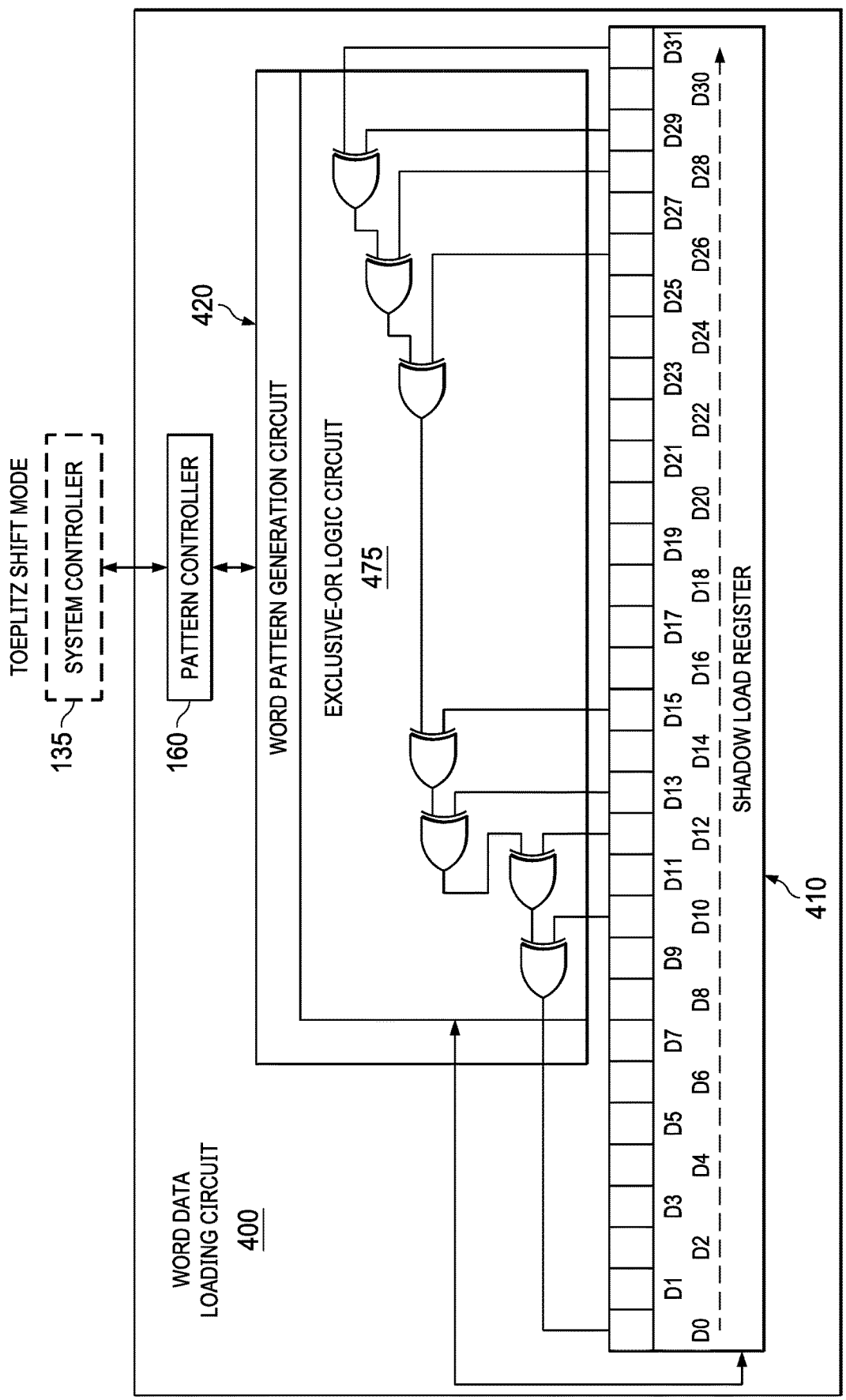
FIG. 4 is a block diagram of still another exemplary word data loading circuit.

With reference to FIGS. 4 and 5, still another example of a word data loading circuit 400 includes a word pattern generation circuit 420 configured to generate the next word, additional word, and further additional words for the shadow load register 410 using a Toeplitz shift mode in accordance with a Toeplitz matrix (see FIG. 5) as sequential words of the pseudorandom pattern are loaded in the shadow load register 410 and shifted into the memory cell array 125 (see FIG. 1).

With further reference to FIG. 4, still yet another example of the word data loading circuit 400 includes a shadow load register 410, the word pattern generation circuit 420, and the pattern controller 160. The word pattern generation circuit 420 includes an exclusive-OR logic circuit 475. The shadow load register 410 is configured to store n bits. FIG. 4 shows 32 bits in the shadow load register 410 for exemplary purposes only. In this example, the word pattern generation circuit 420 is configured to generate the next word, additional word, and further additional words by serially shifting contents of first through n−1 bits of the shadow load register 410 to second through n bit positions and generating content for a first bit position in the shadow load register 410 using a linear feedback shift register (LFSR) that taps select bits of the shadow load register 410 as inputs to an exclusive-OR logic circuit 475 and feeds back an output of the exclusive-OR logic circuit 475 to the first bit position of the shadow load register 410. In a further example, the shadow load register 410 and the exclusive-OR logic circuit 475 form the LFSR. FIG. 4 shows the exclusive-OR logic circuit 475 with an arrangement of seven exclusive-OR gates for exemplary purposes only. Any suitable arrangement of exclusive-OR gates in combination with the shadow load register 410 that provides the LFSR function can be implemented in other examples of exclusive-OR logic. In a further example, the pattern controller 160 is configured to receive configuration, synchronization, and control signals from the system controller 135. In this example, the pattern controller 160 is configured to provide configuration, synchronization, and control information to the word pattern generation circuit 420 in conjunction with operation of the exclusive-OR logic circuit 475 and the LFSR.

Figure 6:
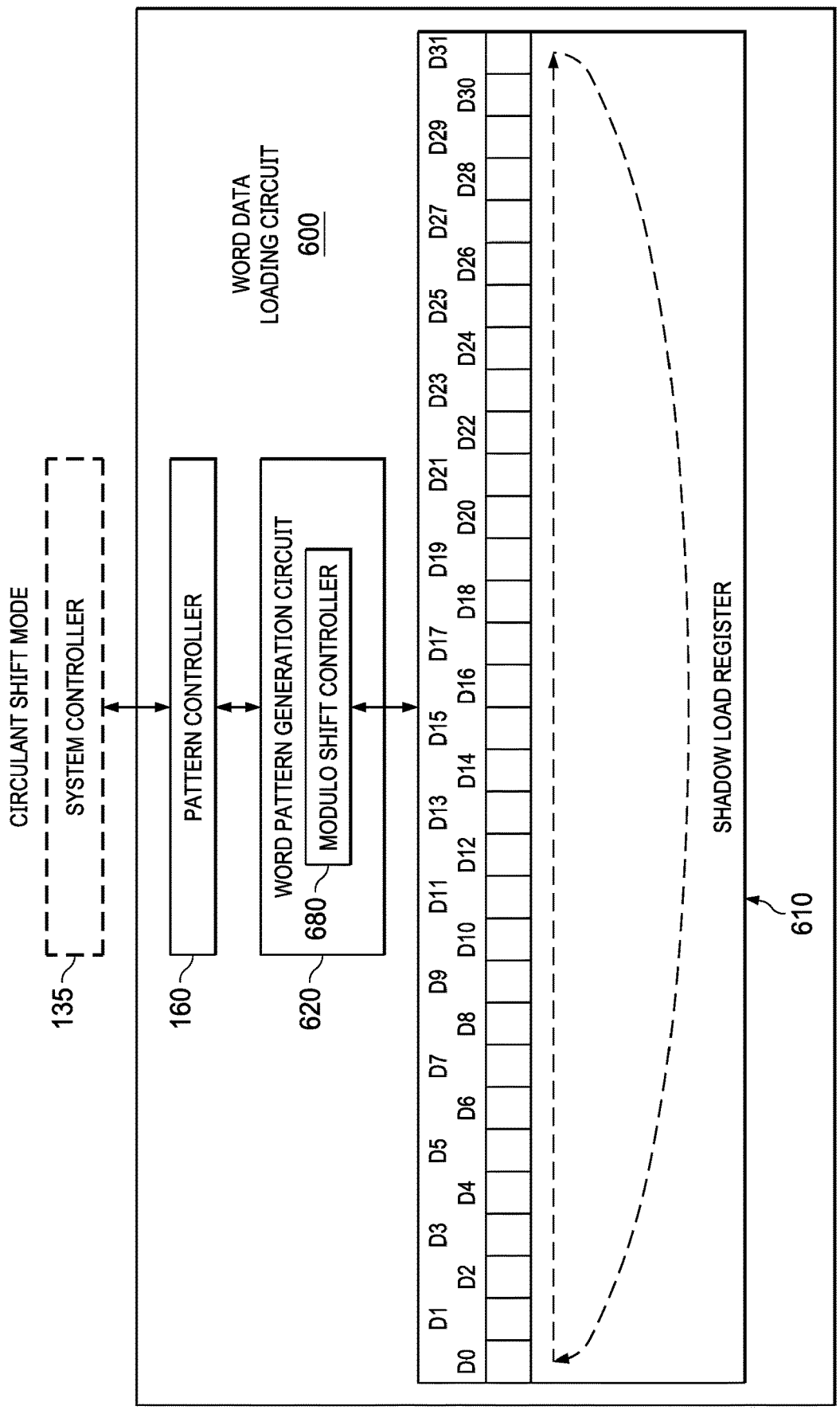
FIG. 6 is a block diagram of still yet another exemplary word data loading circuit.

With reference to FIGS. 6 and 7, another example of as word data loading circuit 600 includes a word pattern generation circuit 620 is configured to generate the next word, additional word, and further additional words for the shadow load register 610 using a circulant shift mode in accordance with a circulant matrix (see FIG. 7) as sequential words of the pseudorandom pattern are loaded in the shadow load register 610 and shifted into the memory cell array 125 (see FIG. 1).

With further reference to FIG. 6, yet another example of the word data loading circuit 600 includes a shadow load register 610, the word pattern generation circuit 620, and the pattern controller 160. The word pattern generation circuit 620 includes a modulo shift controller 680. The shadow load register 610 is configured to store n bits. FIG. 6 shows 32 bits in the shadow load register 610 for exemplary purposes only. In this example, the word pattern generation circuit 620 is configured to generate the next word, additional word, and further additional words by performing a modulo shift on contents of the shadow load register 610 by using a modulo shift controller 680 to serially shifting contents of first through n−1 bits of the shadow load register 610 to second through n bit positions and shifting content of the n bit position to a first bit position. In a further example, the pattern controller 160 is configured to receive configuration, synchronization, and control signals from the system controller 135. In this example, the pattern controller 160 is configured to provide configuration, synchronization, and control information to the word pattern generation circuit 620 in conjunction with operation of the modulo shift controller 680.

Figure 8:
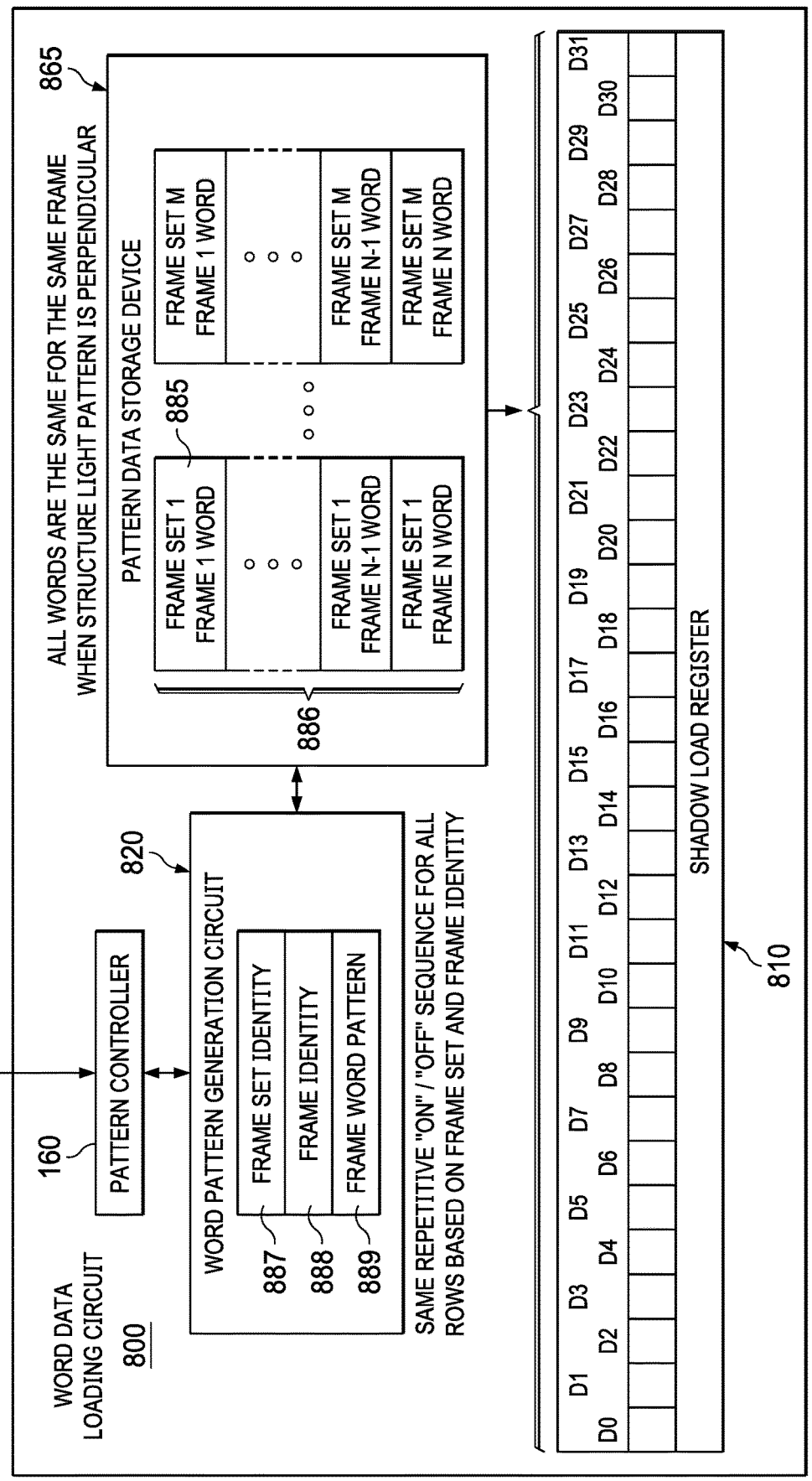
FIG. 8 is a block diagram of another exemplary word data loading circuit.

With reference to FIGS. 8 and 9, still another example of a word data loading circuit 800 implements a pseudorandom pattern for the image frame based on a select frame of a set of frames that define structured light patterns (see FIG. 9). In this example, each structured light pattern includes a known pattern of bars that are perpendicular to an orientation of the shadow load register 810 in relation to the memory cell array 125 (see FIG. 1).

With reference to FIG. 8, still yet another example of the word data loading circuit 800 includes a shadow load register 810, a word pattern generation circuit 820, a pattern data storage device 865, and the pattern controller 160. The shadow load register 810 is configured to store n bits. FIG. 8 shows 32 bits in the shadow load register 810 for exemplary purposes only. In this example, the pattern data storage device 865 stores a frame word for each of 1 through N frames (e.g., frame 1 word 885) in each of 1 through M frame sets (e.g., frame set 1 886). The word pattern generation circuit 820 is configured to select a frame set identity 887, a frame identity 888, and a frame word pattern 889 for the pseudorandom pattern to be loaded in the memory cell array 125 (see FIG. 1). The word pattern generation circuit 820 is configured to generate the seed word, next word, additional word, and further additional words by identifying the select frame of the set of frames (e.g., frame set 1 word 886) upon which the pseudorandom pattern for the image frame is based, selecting a frame word pattern 889 (e.g., frame 1 word 885) for the select frame from the pattern data storage device 865, and parallel shifting the selected frame word pattern 889 (e.g., frame 1 word 885) from the pattern data storage device 950 to the shadow load register 110. The word pattern generation circuit 820 is configured to generate the seed word, next word, additional word, and further additional words for the shadow load register 810 using the same selected frame word pattern 889 (e.g., frame 1 word 885) as sequential words of the pseudorandom pattern defined by the select frame are loaded in the shadow load register 810 and shifted into the memory cell array 125 (see FIG. 1). In a further example, the pattern controller 160 is configured to receive configuration, synchronization, and control signals from the system controller 135. In this example, the pattern controller 160 is configured to provide configuration, synchronization, and control information to the word pattern generation circuit 820 in conjunction with operations to select a frame word pattern 889 from the pattern data storage device 865 and shift the selected frame word (e.g., frame 1 word 885) to the shadow load register 810.

Figure 10:
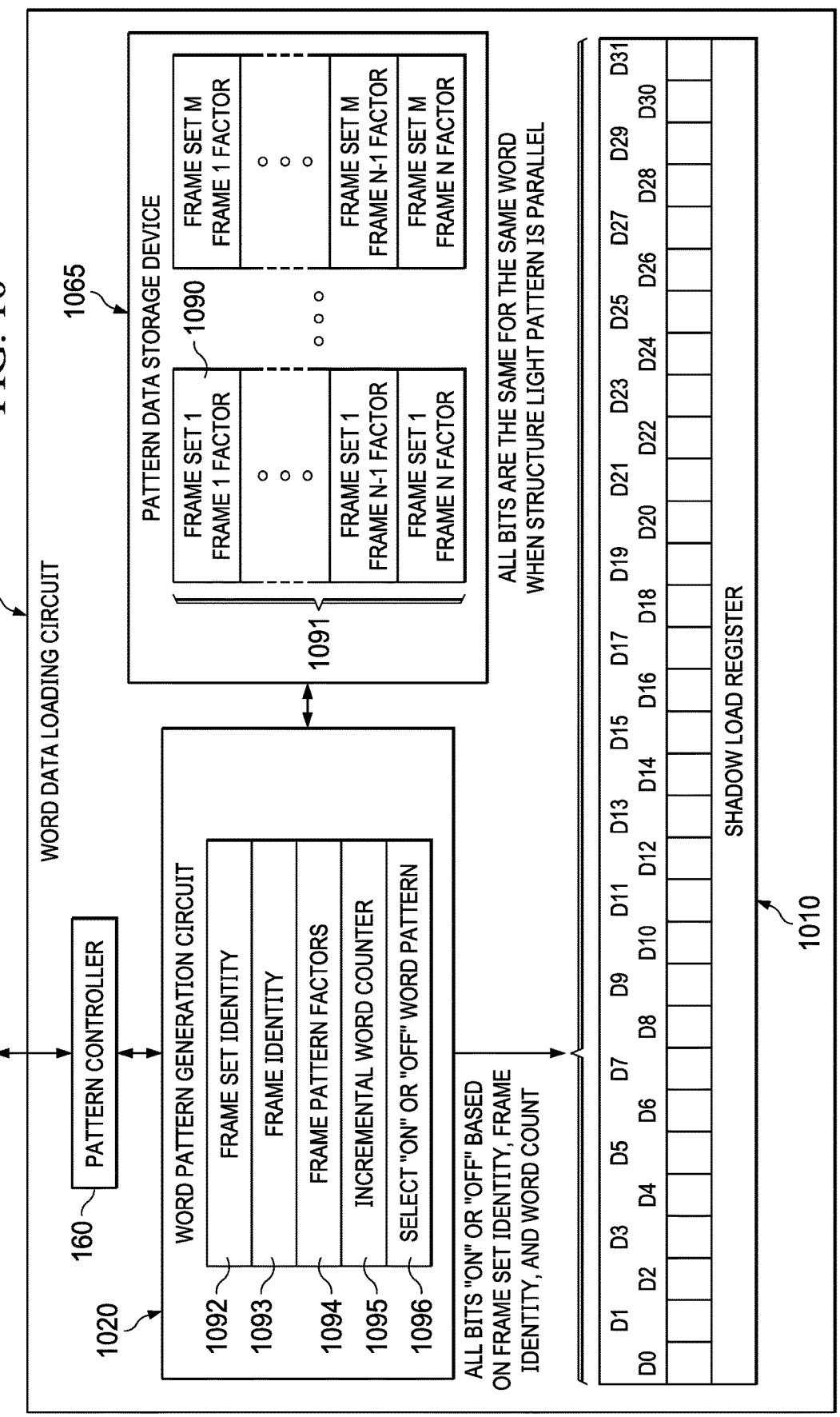
FIG. 10 is a block diagram of yet another exemplary word data loading circuit.

With reference to FIG. 10, another example of a word data loading circuit 1000 implements a pseudorandom pattern for the image frame is based on a select frame of a set of frames that define structured light patterns (see, e.g., FIG. 9). However, in this example, each structured light pattern includes a known pattern of bars that are parallel (rather than perpendicular) to an orientation of a shadow load register 1010 in relation to the memory cell array 125 (see FIG. 1). The word data loading circuit 1000 includes a shadow load register 1010, a word pattern generation circuit 1020, a pattern data storage device 1065, and the pattern controller 160. The shadow load register 1010 is configured to store n bits. FIG. 10 shows 32 bits in the shadow load register 1010 for exemplary purposes only. In this example, the pattern data storage device 1065 stores frame parameters and other characteristics for each of 1 through N frames (e.g., frame 1 factor 1090) in each of 1 through M frame sets (e.g., frame set 1 1091). The word pattern generation circuit 1020 is configured to select a frame set identity 1092, a frame identity 1093, and frame pattern factors 1094 (e.g., frame parameters and other characteristics) for the pseudorandom pattern to be loaded in the memory cell array 125 (see FIG. 1). The word pattern generation circuit 1020 implements a word counter 1095 to incrementally count words of the pseudorandom pattern for the selected frame and selects between an "on" or "off" word pattern for each word based on the word count and the frame pattern factors. All bits are the same for the same word when the structured light pattern is parallel to the orientation of the shadow load register 1010. The word pattern generation circuit 1020 determine whether all bits are "on" or "off" for a given word pattern 1096 based on the frame set identity, frame identity, word count, and frame pattern factors. For example, the frame parameters and other characteristics (e.g., frame 1 factor 1090) specify alternating groups (e.g., 10 words) of "on" and "off" words in relation to the structured light pattern of parallel bars for the select frame.

The word pattern generation circuit 1020 in this example is configured to generate the seed word, next word, additional word, and further additional words by identifying the select frame of the set of frames upon which the pseudorandom pattern for the image frame is based, obtaining dimensional factors (e.g., frame 1 factor 1090) for the pattern of bars of the select frame from the pattern data storage device 1065, identifying a current word to be generated in the select frame based on incrementally counting words in the select frame as the next word, additional word, and further additional words are generated, and setting all bits in the shadow load register 1010 to "on" or "off" for the current word pattern 1096 based on the dimensional factors for the pattern of bars and the incremental counting of words as they are generated. The word pattern generation circuit 1020 is configured to generate the seed word, next word, additional word, and further additional words for the shadow load register 110 by setting all bits in shadow load register to the same value based on the incremental counting of words as they are generated, identifying the current word, and determining whether all bits of the current word are "on" or "off" based on the dimensional factors for the pattern of bars of the select frame. For example, the word pattern generation circuit 1020 sets all bits in the shadow load register 1010 to "on" using a "set" control signal and sets all bits in the shadow load register 1010 to "off" using a "reset" control signal. In another example, the word pattern generation circuit 1020 sets all bits in the shadow load register 1010 to "on" by transferring an "on" word to the shadow load register 1010 and sets all bits in the shadow load register to "off" by transferring an "off" word to the shadow load register 1010.

In a further example, the pattern controller 160 is configured to receive configuration, synchronization, and control signals from the system controller 135. In this example, the pattern controller 160 is configured to provide configuration, synchronization, and control information to the word pattern generation circuit 1020 in conjunction with operations to select a frame word factor (e.g., frame 1 factor 1090) from the pattern data storage device 1065 and select an "on" or "off" word pattern 1096 for word pattern to be stored in the shadow load register 1010.

Figure 11:
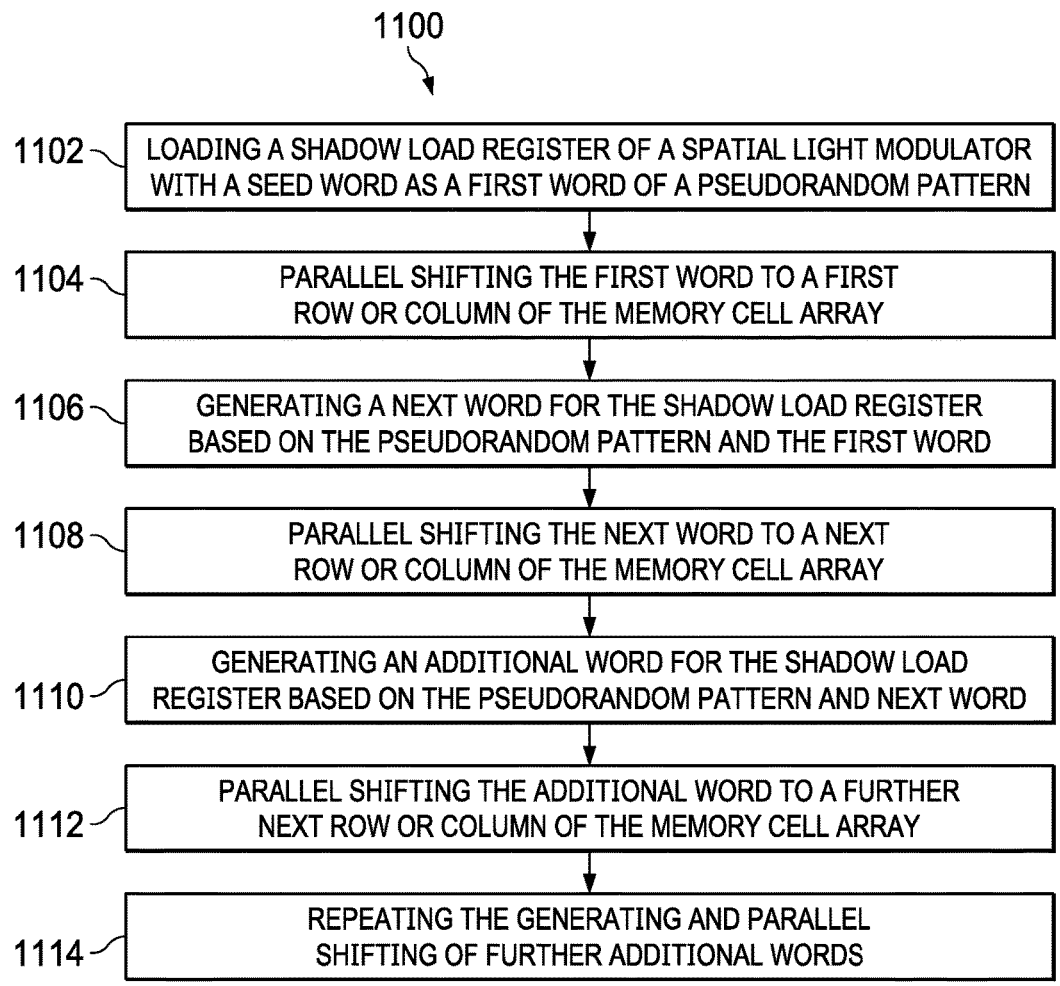
FIG. 11 is a flow chart of a process for generating pseudorandom patterns in a spatial light modulator.

With reference to FIG. 11, a process 1100 for generating pseudorandom patterns in a spatial light modulator begins at 1102 where a shadow load register of a spatial light modulator is loaded with a seed word as a first word of a pseudorandom pattern for an image frame of a desired scene in conjunction with loading the pseudorandom pattern in a memory cell array of the spatial light modulator and configuring a mirror element array of the spatial light modulator to sense the pseudorandom pattern for the image frame after the pseudorandom pattern is loaded in the memory cell array. Next, the first word is parallel shifted to a first row or column of the memory cell array (1104). At 1106, a next word for the shadow load register is generated based on the pseudorandom pattern and the first word and the shadow load register is controlled to change the first word to the next word. Next, the next word is parallel shifted to a next row or column of the memory cell array (1108). At 1110, an additional word for the shadow load register is generated based on the pseudorandom pattern and the next word and the shadow load register is controlled to change the next word to the additional word. Next, the additional word is parallel shifted to a further next row or column of the memory cell array (1112). At 1114, the process continues by repeating the generating and parallel shifting of further additional words from the shadow load register to the memory cell array until the pseudorandom pattern for the image frame is loaded in the memory cell array.

In another example, the process 1100 also includes receiving the seed word from a system controller via a serial data receiver of the spatial light modulator. Portions of the seed word are parallel shifted from the serial data receiver to a word shift register of the spatial light modulator until the seed word is loaded in the word shift register. The seed word is parallel shifted from the word shift register to the shadow load register.

In yet another example, the process 1100 also includes identifying the seed word in a pattern data storage device of the spatial light modulator. The seed word is parallel shifted from the pattern data storage device to the shadow load register. In a further example, the process 1100 also includes receiving seed word identification information from a system controller at a pattern controller of the spatial light modulator. The seed word identification information is provided from the pattern controller to the word pattern generation circuit in conjunction with the word pattern generation circuit parallel shifting the seed word from the pattern data storage device to the shadow load register.

In still another example of the process 1100, generation of the next word, additional word, and further additional words for the shadow load register is performed using a Toeplitz shift mode in accordance with a Toeplitz matrix as sequential words of the pseudorandom pattern are loaded in the shadow load register and shifted into the memory cell array.

In still yet another example of the process 1100, the shadow load register is configured to store n bits. In this example, the generating includes serially shifting contents of first through n−1 bits of the shadow load register to second through n bit positions. The generating further includes generating content for a first bit position in the shadow load register using a linear feedback shift register (LFSR) that taps select bits of the shadow load register as inputs to an exclusive-OR logic circuit and feeds back an output of the exclusive-OR logic circuit to the first bit position of the shadow load register. In a further example of the process, the shadow load register and the exclusive-OR logic circuit form the LFSR.

In another example of the process 1100, generation of the next word, additional word, and further additional words for the shadow load register is performed using a circulant shift mode in accordance with a circulant matrix as sequential words of the pseudorandom pattern are loaded in the shadow load register and shifted into the memory cell array.

In yet another example of the process 1100, the shadow load register is configured to store n bits. In this example, the generating includes performing a modulo shift on contents of the shadow load register by serially shifting contents of first through n−1 bits of the shadow load register to second through n bit positions and shifting content of the n bit position to a first bit position.

In still another example of the process 1100, the pseudorandom pattern for the image frame is based on a select frame of a set of frames that define structured light patterns. Each structured light pattern including a known pattern of bars that are perpendicular to an orientation of the shadow load register in relation to the memory cell array. In this example, generating the seed word, next word, additional word, and further additional words includes identifying the select frame of the set of frames upon which the pseudorandom pattern for the image frame is based. A word pattern for the select frame is selected from a pattern data storage device. The generating also includes parallel shifting the selected word pattern from the pattern data storage device to the shadow load register. In a further example of the process 1100, generation of the seed word, next word, additional word, and further additional words for the shadow load register is performed using the same selected word pattern as sequential words of the pseudorandom pattern defined by the select frame are loaded in the shadow load register and shifted into the memory cell array.

In still yet another example of the process 1100, the pseudorandom pattern for the image frame is based on a select frame of a set of frames that define structured light patterns. Each structured light pattern including a known pattern of bars that are parallel to an orientation of the shadow load register in relation to the memory cell array. In this example, generating the seed word, next word, additional word, and further additional words includes identifying the select frame of the set of frames upon which the pseudorandom pattern for the image frame is based. Dimensional factors for the pattern of bars of the select frame are obtained from a pattern data storage device. A current word to be generated in the select frame is identified based on incrementally counting words in the select frame as the next word, additional word, and further additional words are generated. The generating also includes setting all bits in the shadow load register to "on" or "off" for the current word based on the dimensional factors for the pattern of bars and the incremental counting of words as they are generated. In a further example of the process 1100, generation of the seed word, next word, additional word, and further additional words for the shadow load register is performed by setting all bits in shadow load register to the same value based on the incremental counting of words as they are generated, identifying the current word, and determining whether all bits of the current word are "on" or "off" based on the dimensional factors for the pattern of bars of the select frame.

Figure 12:
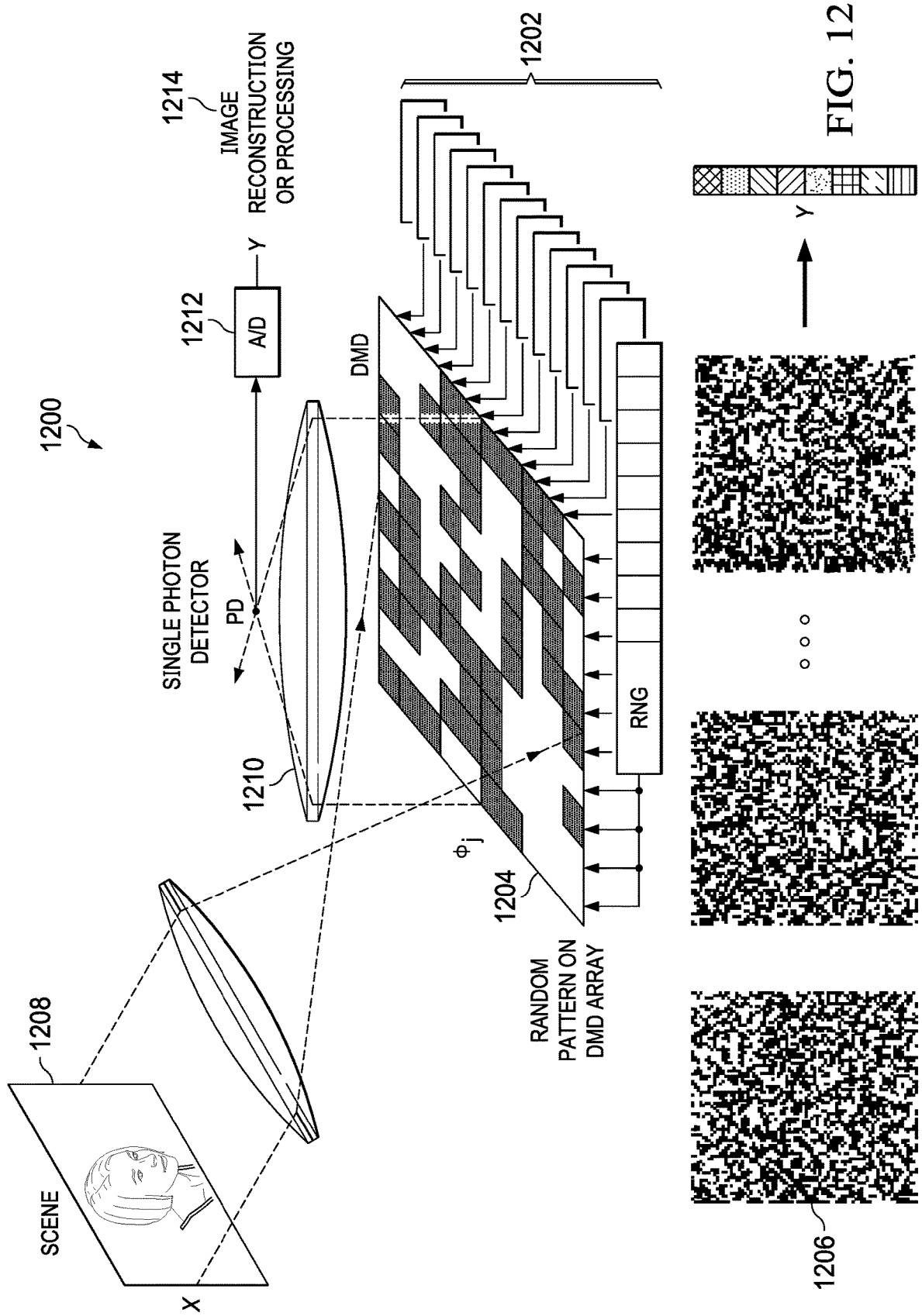
FIG. 12 is a functional diagram of image processing operations using a DMD-type spatial light modulator.

With reference to FIG. 12, a DMD-type spatial light modulator 1200 includes a memory call array 1202 and a mirror element array 1204 that is configured to reflect a pseudorandom pattern of pixels 1206 of a scene 1208 to a photon detector 1210. The photon detector 1210 provides an analog signal of the image frame to an analog-to-digital (A/D) converter 1212 which transmits a digital signal of the image frame to an image reconstruction device 1214. The detecting and imaging process is repeated for n image frames that exhibit different pseudorandom pattern characteristics. The set of n image frames enables the image reconstruction device 1214 to produce a reconstruction of the scene using any suitable combination of image processing techniques.

As for DMD-based CS application, one impediment to the pattern refresh rate is the interface to the DMD. The time it takes to transmit, receive, and load a binary pattern on the DMD is an order of magnitude slower than the switching speed of the micromirrors. For example, the load time of a DMD is around 100 microseconds, but the switching speed of the micromirrors is around 8 microseconds. Circulant matrices (see FIG. 7) can be used to decrease the processing requirements and corresponding execution time for image frame processing. In a circulant matrix implementation, a pseudorandom pattern is generated for one row, and then all other rows are derived by simply modulo shifting the first row pattern to produce a pseudorandom pattern for the image frame. Due to its simplicity, this circulant sampling matrix can be generated by the DMD itself which avoids the need for external data loads. Several examples described above show use of a shift register, equivalent to a line width, that is already present in the DMD to receive and buffer external data. For example, the existing shift register is converted into a linear-feedback shift register (LFSR) to generate a pseudo-random binary pattern for the first row in a circulant matrix. The LFSR update is once per DMD load.

Figure 13:
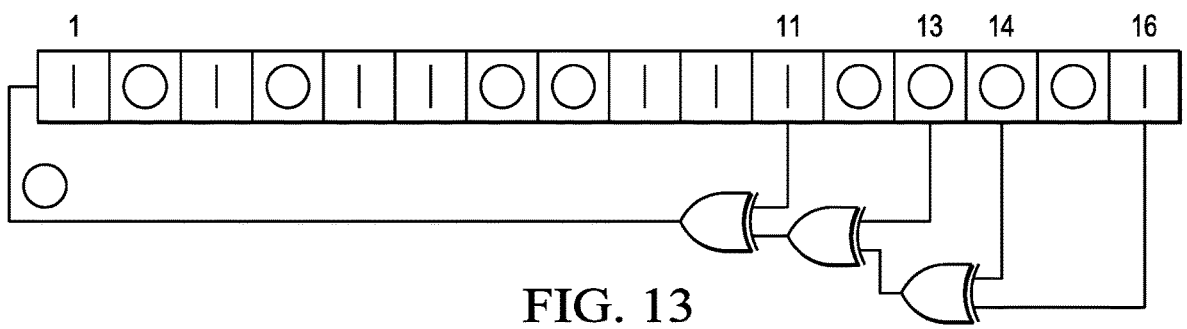
FIG. 13 is a diagram of an exemplary 16-bit Fibonacci LFSR.

An example of a 16-bit Fibonacci LFSR is shown in FIG. 13. Conversion of the existing shift register into an LFSR is implemented through the addition of feedback with exclusive-OR gates.

An existing DMD uses a receive architecture that buffers an input signal into its row shift register and performs a row-to-row load. As described in various examples above, the row-to-row loading scheme is implemented but a modulo shift is added. In other words, a shift of one element occurs between each row-to-row load. With this LFSR and modulo shift scheme, the speed of a full load is limited by the row-to-row timing, which is approximately 30 nanoseconds. For a VGA DMD with 480 lines, an entire load of a circulant matrix may be completed within 14.4 µs (i.e., 30 ns/line×480 lines), which is faster than a traditional load time and closer to the limitation imposed by micromirror dynamics (e.g., 8 µs). To put it another way, a 69 kHz pattern update rate is achievable based on these calculations.

For higher resolution DMDs, the architecture described herein may be split in two. In other words, one LFSR is used for one side of the DMD and a second shift register is used for the other side of the DMD. The second shift register is appropriately offset from the first. For example, if the DMD had 2160 lines, the second shift register would be offset from the first by 2160 positions. Row-to-row loads occur in parallel between the top and bottom halves of the DMD. This decreases the total load time by 50%.

Modifications are possible in the described examples, and other examples are possible, within the scope of the claims.

The following is claimed:

1. A data loading circuit for a digital micromirror device (DMD), the DMD having a mirror element array coupled to a memory cell array, and the data loading circuit comprising:
   a shadow load register configured to store a current word of a current portion of a pseudorandom pattern of pixels, the pseudorandom pattern being formed by a series of words;
   a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column;
   a word pattern generation circuit coupled to the shadow load register, the word pattern generation circuit configured to: generate a next word of a next portion of the pseudorandom pattern based on the current word; and cause the shadow load register to store the next word as the current word;
   a serial data receiver configured to receive a seed word from a system controller; and
   a word shift register coupled to the serial data receiver;
   in which the word pattern generation circuit, the shadow load register, and the load controller are configured to respectively generate, store and parallel shift the series of words into the memory cell array until the pseudorandom pattern is fully shifted into the memory cell array for causing the mirror element array to reflect the pseudorandom pattern of pixels from a scene;
   the serial data receiver is configured to parallel shift portions of the seed word into the word shift register until the seed word is fully shifted in the word shift register; and
   the word shift register is configured to parallel shift the seed word into the shadow load register.

2. The data loading circuit of claim 1, further comprising:
   a pattern data storage device coupled to the word pattern generation circuit;
   in which the word pattern generation circuit is configured to: identify the seed word in the pattern data storage device; and parallel shift the seed word from the pattern data storage device into the shadow load register.

3. A data loading circuit for a digital micromirror device (DMD), the DMD having a mirror element array coupled to a memory cell array, and the data loading circuit comprising:
   a shadow load register configured to store a current word of a current portion of a pseudorandom pattern of pixels, the pseudorandom pattern being formed by a series of words;
   a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column; and
   a word pattern generation circuit coupled to the shadow load register, the word pattern generation circuit configured to: generate a next word of a next portion of the pseudorandom pattern based on the current word; and cause the shadow load register to store the next word as the current word;
   in which the word pattern generation circuit, the shadow load register, and the load controller are configured to respectively generate, store and parallel shift the series of words into the memory cell array until the pseudorandom pattern is fully shifted into the memory cell array for causing the mirror element array to reflect the pseudorandom pattern of pixels from a scene; and
   the word pattern generation circuit is configured to generate the next word using a Toeplitz shift mode in accordance with a Toeplitz matrix.

4. A data loading circuit for a digital micromirror device (DMD), the DMD having a mirror element array coupled to a memory cell array, and the data loading circuit comprising:
   a shadow load register configured to store a current word of a current portion of a pseudorandom pattern of pixels, the pseudorandom pattern being formed by a series of words;
   a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column; and
   a word pattern generation circuit coupled to the shadow load register, the word pattern generation circuit configured to: generate a next word of a next portion of the pseudorandom pattern based on the current word; and cause the shadow load register to store the next word as the current word;
   in which the word pattern generation circuit, the shadow load register, and the load controller are configured to respectively generate, store and parallel shift the series of words into the memory cell array until the pseudorandom pattern is fully shifted into the memory cell array for causing the mirror element array to reflect the pseudorandom pattern of pixels from a scene;
   the shadow load register is configured to store n bits; and
   the word pattern generation circuit is configured to generate the next word by serially shifting contents of first through n-1 bits of the shadow load register to second through n bit positions and generating content for a first bit position in the shadow load register using a linear feedback shift register (LFSR) that taps select bits of the shadow load register as inputs to an exclusive-OR logic circuit and feeds back an output of the exclusive-OR logic circuit to the first bit position of the shadow load register.

5. The data loading circuit of claim 4, wherein the word pattern generation circuit is configured to generate the next word for the shadow load register using a circulant shift mode in accordance with a circulant matrix.

6. A data loading circuit for a digital micromirror device (DMD), the DMD having a mirror element array coupled to a memory cell array, and the data loading circuit comprising:
   a shadow load register configured to store a current word of a current portion of a pseudorandom pattern of pixels, the pseudorandom pattern being formed by a series of words;
   a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column; and a word pattern generation circuit coupled to the shadow load register, the word pattern generation circuit configured to: generate a next word of a next portion of the pseudorandom pattern based on the current word; and cause the shadow load register to store the next word as the current word;

in which the word pattern generation circuit, the shadow load register, and the load controller are configured to respectively generate, store and parallel shift the series of words into the memory cell array until the pseudorandom pattern is fully shifted into the memory cell array for causing the mirror element array to reflect the pseudorandom pattern of pixels from a scene;

the shadow load register is configured to store n bits; and the word pattern generation circuit is configured to generate the next word by performing a modulo shift on contents of the shadow load register by serially shifting contents of first through n-1 bits of the shadow load register to second through n bit positions and shifting content of the n bit position to a first bit position.

7. A data loading circuit for a digital micromirror device (DMD), the DMD having a mirror element array coupled to a memory cell array, and the data loading circuit comprising:

a shadow load register configured to store a current word of a current portion of a pseudorandom pattern of pixels, the pseudorandom pattern being formed by a series of words;

a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column;

a word pattern generation circuit coupled to the shadow load register, the word pattern generation circuit configured to: generate a next word of a next portion of the pseudorandom pattern based on the current word; and cause the shadow load register to store the next word as the current word; and a pattern data storage device;

in which the word pattern generation circuit, the shadow load register, and the load controller are configured to respectively generate, store and parallel shift the series of words into the memory cell array until the pseudorandom pattern is fully shifted into the memory cell array for causing the mirror element array to reflect the pseudorandom pattern of pixels from a scene;

the pseudorandom pattern is based on a select frame of a set of frames that define structured light patterns, each structured light pattern including a known pattern of bars that are perpendicular to an orientation of the shadow load register in relation to the memory cell array; and the word pattern generation circuit is configured to generate the next word by identifying the select frame of the set of frames upon which the pseudorandom pattern is based, selecting a word pattern for the select frame from the pattern data storage device, and parallel shifting the selected word pattern from the pattern data storage device to the shadow load register.

8. A data loading circuit for a digital micromirror device (DMD), the DMD having a mirror element array coupled to a memory cell array, and the data loading circuit comprising:

a shadow load register configured to store a current word of a current portion of a pseudorandom pattern of pixels, the pseudorandom pattern being formed by a series of words;

a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column;

a word pattern generation circuit coupled to the shadow load register, the word pattern generation circuit configured to: generate a next word of a next portion of the pseudorandom pattern based on the current word; and cause the shadow load register to store the next word as the current word; and a pattern data storage device;

in which the word pattern generation circuit, the shadow load register, and the load controller are configured to respectively generate, store and parallel shift the series of words into the memory cell array until the pseudorandom pattern is fully shifted into the memory cell array for causing the mirror element array to reflect the pseudorandom pattern of pixels from a scene;

the pseudorandom pattern is based on a select frame of a set of frames that define structured light patterns, each structured light pattern including a known pattern of bars that are parallel to an orientation of the shadow load register in relation to the memory cell array; and, the word pattern generation circuit is configured to generate the next word by identifying the select frame of the set of frames upon which the pseudorandom pattern is based, obtaining dimensional factors for the pattern of bars of the select frame from the pattern data storage device, identifying the next word to be generated in the select frame based on incrementally counting words in the select frame, and setting all bits in the shadow load register to "on" or "off" for the next word based on the dimensional factors for the pattern of bars and the incremental counting of words as they are generated.

9. A spatial light modulator, comprising:

a memory cell array;

a mirror element array coupled to the memory cell array; and a data loading circuit including:

a shadow load register configured to store a current word of a current portion of a pseudorandom pattern of pixels, the pseudorandom pattern being formed by a series of words;

a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column; and a word pattern generation circuit coupled to the shadow load register, the word pattern generation circuit configured to: generate a next word of a next portion of the pseudorandom pattern based on the current word; and cause the shadow load register to store the next word as the current word;

in which the word pattern generation circuit, the shadow load register, and the load controller are configured to respectively generate, store and parallel shift the series of words into the memory cell array until the pseudorandom pattern is fully shifted into the memory cell array;

the memory cell array is configured to cause the mirror element array to reflect the pseudorandom pattern of pixels from a scene;

the shadow load register is configured to store n bits; and the word pattern generation circuit is configured to generate the next word by serially shifting contents of first through n-1 bits of the shadow load register to second through n bit positions and generating content for a first bit position in the shadow load register using a linear feedback shift register (LFSR) that taps select bits of the shadow load register as inputs to an exclusive-OR logic circuit and feeds back an output of the exclusive-OR logic circuit to the first bit position of the shadow load register.

10. A spatial light modulator, comprising:

a memory cell array;

a mirror element array coupled to the memory cell array; and a data loading circuit including:
- a shadow load register configured to store a current word of a current portion of a pseudorandom pattern of pixels, the pseudorandom pattern being formed by a series of words;
- a load controller coupled to the shadow load register and adapted to be coupled the memory cell array, the load controller configured to parallel shift the current word from the shadow load register into a current row or column of the memory cell array and, after the parallel shift, designate a next row or column of the memory cell array as the current row or column;
- a word pattern generation circuit coupled to the shadow load register, the word pattern generation circuit configured to: generate a next word of a next portion of the pseudorandom pattern based on the current word; and cause the shadow load register to store the next word as the current word; and
- a pattern data storage device;

in which the word pattern generation circuit, the shadow load register, and the load controller are configured to respectively generate, store and parallel shift the series of words into the memory cell array until the pseudorandom pattern is fully shifted into the memory cell array;

the memory cell array is configured to cause the mirror element array to reflect the pseudorandom pattern of pixels from a scene;

the pseudorandom pattern is based on a select frame of a set of frames that define structured light patterns, each structured light pattern including a known pattern of bars that are perpendicular to an orientation of the shadow load register in relation to the memory cell array; and in which the word pattern generation circuit is configured to generate the next word by identifying the select frame of the set of frames upon which the pseudorandom pattern is based, selecting a word pattern for the select frame from the pattern data storage device, and parallel shifting the selected word pattern from the pattern data storage device to the shadow load register.

11. The data loading circuit of claim 1, wherein the word pattern generation circuit is configured to generate the next word for the shadow load register using a circulant shift mode in accordance with a circulant matrix.

12. The data loading circuit of claim 3, further comprising:
- a pattern data storage device coupled to the word pattern generation circuit;
- in which the word pattern generation circuit is configured to: identify the seed word in the pattern data storage device; and parallel shift the seed word from the pattern data storage device into the shadow load register.

13. The data loading circuit of claim 3, wherein the word pattern generation circuit is configured to generate the next word for the shadow load register using a circulant shift mode in accordance with a circulant matrix.

14. The data loading circuit of claim 4, further comprising:
- a pattern data storage device coupled to the word pattern generation circuit;
- in which the word pattern generation circuit is configured to: identify the seed word in the pattern data storage device; and parallel shift the seed word from the pattern data storage device into the shadow load register.

15. The data loading circuit of claim 6, further comprising:
- a pattern data storage device coupled to the word pattern generation circuit;
- in which the word pattern generation circuit is configured to: identify the seed word in the pattern data storage device; and parallel shift the seed word from the pattern data storage device into the shadow load register.

16. The data loading circuit of claim 6, wherein the word pattern generation circuit is configured to generate the next word for the shadow load register using a circulant shift mode in accordance with a circulant matrix.

17. The data loading circuit of claim 7, further comprising:
- a pattern data storage device coupled to the word pattern generation circuit;
- in which the word pattern generation circuit is configured to: identify the seed word in the pattern data storage device; and parallel shift the seed word from the pattern data storage device into the shadow load register.

18. The data loading circuit of claim 7, wherein the word pattern generation circuit is configured to generate the next word for the shadow load register using a circulant shift mode in accordance with a circulant matrix.

19. The data loading circuit of claim 8, further comprising:
- a pattern data storage device coupled to the word pattern generation circuit;
- in which the word pattern generation circuit is configured to: identify the seed word in the pattern data storage device; and parallel shift the seed word from the pattern data storage device into the shadow load register.

20. The data loading circuit of claim 8, wherein the word pattern generation circuit is configured to generate the next word for the shadow load register using a circulant shift mode in accordance with a circulant matrix.

* * * * *